United States Patent [19]

Cornelius

[11] 4,204,643
[45] May 27, 1980

[54] SPRINKLER LEVELER AND WIND COMPENSATING DEVICE

[75] Inventor: Gail Cornelius, Portland, Oreg.

[73] Assignee: R. M. Wade & Co., Portland, Oreg.

[21] Appl. No.: 923,715

[22] Filed: Jul. 12, 1978

[51] Int. Cl.² .................... B05B 3/02; B05B 12/12
[52] U.S. Cl. ................................. 239/212; 239/587
[58] Field of Search ............... 239/1, 177, 212, 225, 239/231–233, 261, 264, 587

[56] References Cited

U.S. PATENT DOCUMENTS

| | | | |
|---|---|---|---|
| 2,988,287 | 6/1961 | Sherman | 239/177 X |
| 3,002,697 | 10/1961 | Jones | 239/212 |
| 3,090,566 | 5/1963 | Snyder et al. | 239/225 X |
| 3,179,340 | 4/1965 | Walton et al. | 239/212 |
| 3,603,508 | 9/1971 | Ingram et al. | 239/587 X |
| 3,618,859 | 11/1971 | Watts | 239/212 |
| 3,667,673 | 6/1972 | Knudsen | 239/1 |

Primary Examiner—Johnny D. Cherry
Attorney, Agent, or Firm—Phillips, Moore, Weissenberger, Lempio & Majestic

[57] ABSTRACT

A main irrigation pipe with wheels fixed thereto has mounted along its length a plurality of movable sprinkler heads. Each sprinkler head has connected thereto a flat, bladelike member, the weight of which aids in urging that sprinkler head toward an erect position, meanwhile with the bladelike member compensating for wind by leaning the sprinkler head into the wind to provide a more even distribution of water.

8 Claims, 4 Drawing Figures

4,204,643

SPRINKLER LEVELER AND WIND COMPENSATING DEVICE

TECHNICAL FIELD

This invention relates to irrigation apparatus, and more particularly, to an irrigation system including sprinkler heads which tend to be self-righting and which move in a manner so as to compensate for wind.

BACKGROUND ART

In a typical irrigation apparatus, an elongated main pipe or line has a plurality of large support wheels fixed thereto along its length. The irrigation line also includes a plurality of sprinkler heads positioned at intervals there along. In a typical use of the device, water under pressure is supplied to the main pipe, exiting through the sprinkle heads along the length of the main pipe, with the pipe remaining in a fixed position relative to the ground. When the area of ground adjacent the apparatus is sufficiently irrigated, turning force is applied to the main pipe to rotate it about its longitudinal axis, so that the wheels in turn rotate, whereby the apparatus may be moved to a new location. During such movement, water under pressure is not supplied to the apparatus, so that no irrigation during this line movement takes place.

Upon arrival of the apparatus in another area to be irrigated, the apparatus is stopped in a position wherein each sprinkler head is substantially erect, so that the operation of the sprinkler heads will be in accordance with the desires of the operator. In the case wherein the sprinkler heads are rigidly fixed to the main pipe, a certain amount of time-consuming alignment is necessary to achieve this. The problem is made more difficult by the very considerable length of main pipe and the possibility of torsional displacement of portions of the pipe relative to each other, or due to the unevenness of the ground upon which the wheels rest.

Irrigation systems which include provision for self-erecting sprinklers are known (for example, U.S. Pat. No. 3,002,697 to Jones, U.S. Pat. No. 3,045,922 to Jensen, U.S. Pat. No. 3,090,566 to Snyder et al, and U.S. Pat. No. 3,143,298 to Jones). In these patents, each pivotal structure is raised sufficiently from the main line to allow the entire pivotal structure to clear the main line as it swings. Additionally, in these patents, the center of gravity of each pivotal structure is not directly below the weight-bearing pivotal connection of the pivotal structure. Thus, a cantilevered support of the weight is in effect.

An additional problem occurring in the type of system having sprinkler heads rigidly secured to a main line is that, even with initial, proper, erect positioning of the sprinkler heads, no provision is made for wind which disturbs the pattern of irrigation in an undersirable way.

DISCLOSURE OF THE INVENTION

Accordingly, it is an object of this invention to provide irrigation apparatus which includes sprinkler heads which tend to be urged toward an erect position through an appropriate pivotal connection.

It is a further object of this invention to provide irrigation apparatus which, while fulfilling the above object, provides that the weight of the pivotal structure is carried in a highly efficient manner.

It is a still further object of this invention to provide apparatus which, while fulfilling the above objects, provides compensation for wind acting in the area of the irrigation apparatus.

It is a still further object of this invention to provide apparatus which, while fulfilling the above objects, is extremely compact and efficient in design.

Broadly stated, the irrigation apparatus comprises a main pipe, and a branch pipe secured to the main pipe. Water conducting means are pivotally connected to the branch pipe, and a sprinkler head is secured to the water conducting means. A bladelike member has substantially flat opposite sides, and connector means interconnect the water conducting means and bladelike member. The center of gravity of the combined sprinkler head, water conducting means, bladelike member, and connector means are positioned so that the sprinkler head is urged toward an erect position. The center of gravity of the combined sprinkler head, water conducting means, bladelike member, and connector means lies substantially directly below the pivotal connection of the water conducting means and branch pipe with the sprinkler head in an erect position. The sprinkler head and bladelike member are positioned so that the main pipe lines generally therebetween with the sprinkler head in an erect position.

BRIEF DESCRIPTION OF THE DRAWINGS

These and other objects of the invention will become apparent from a study of the following specifications and drawings, in which:

FIG. 4 is an enlarged view, partially in section, of a portion of the apparatus of FIGS. 2 and 3.

BEST MODE FOR CARRYING OUT THE INVENTION

Figure 1:
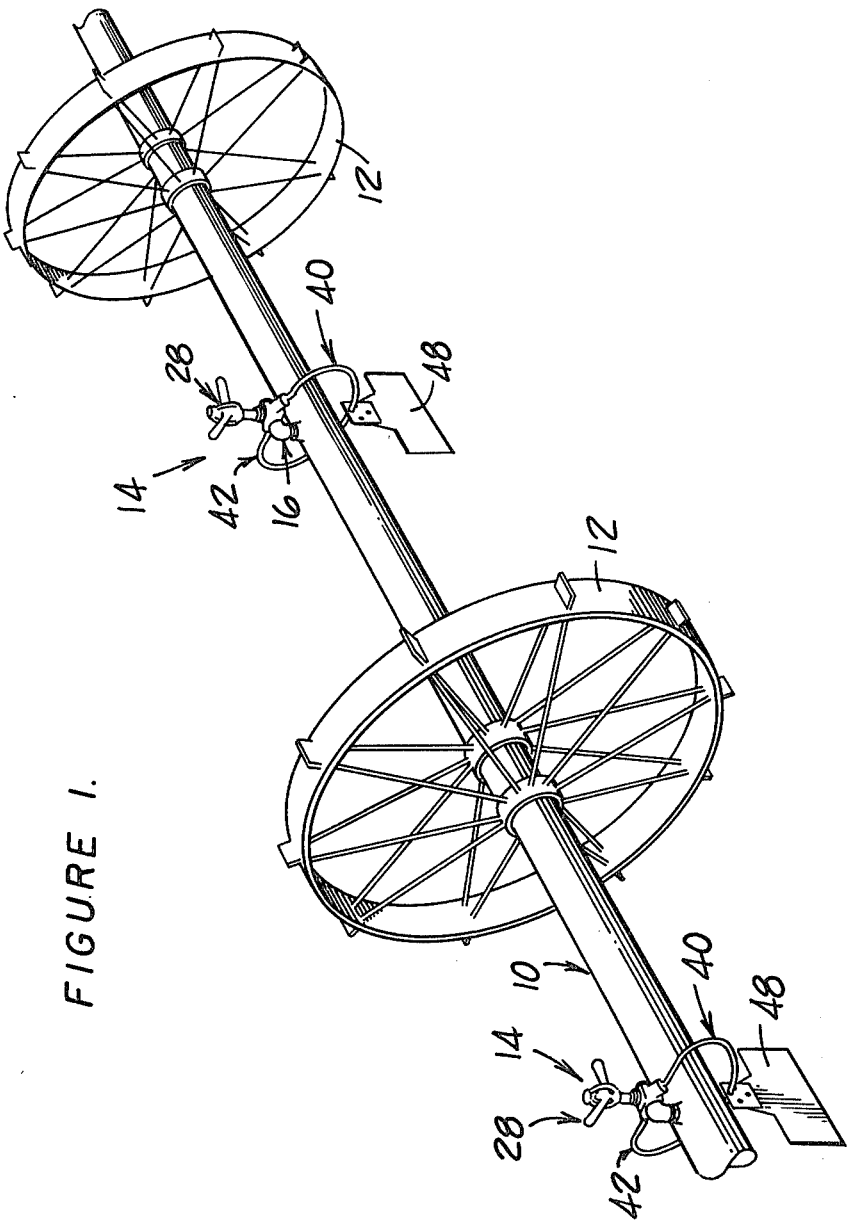
FIG. 1 is a perspective view of irrigation apparatus incorporating the present invention.

Shown in FIG. 1 is an elongated main pipe 10 having a plurality of wheels 12 fixed thereto along its length, the main pipe 10 having its longitudinal axis positioned substantially horizontally. Disposed between each pair of wheels 12 is an irrigation structure 14 incorporating the present invention, and since each of these irrigation structures 14 is identical, only one will be described in detail.

Figure 2:
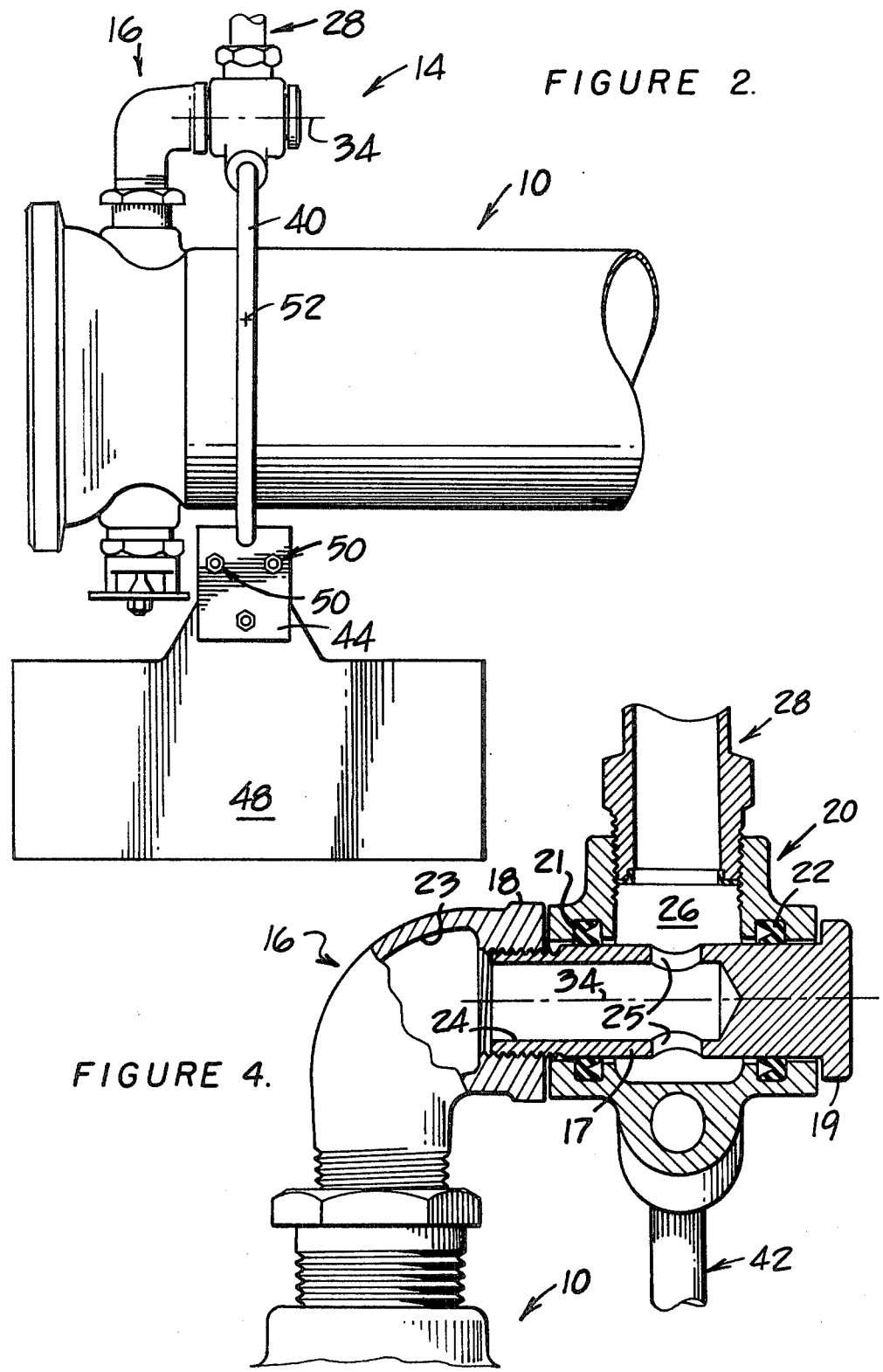
FIG. 2 is an enlarged side elevation of a portion of the apparatus of FIG. 1.
Figure 3:
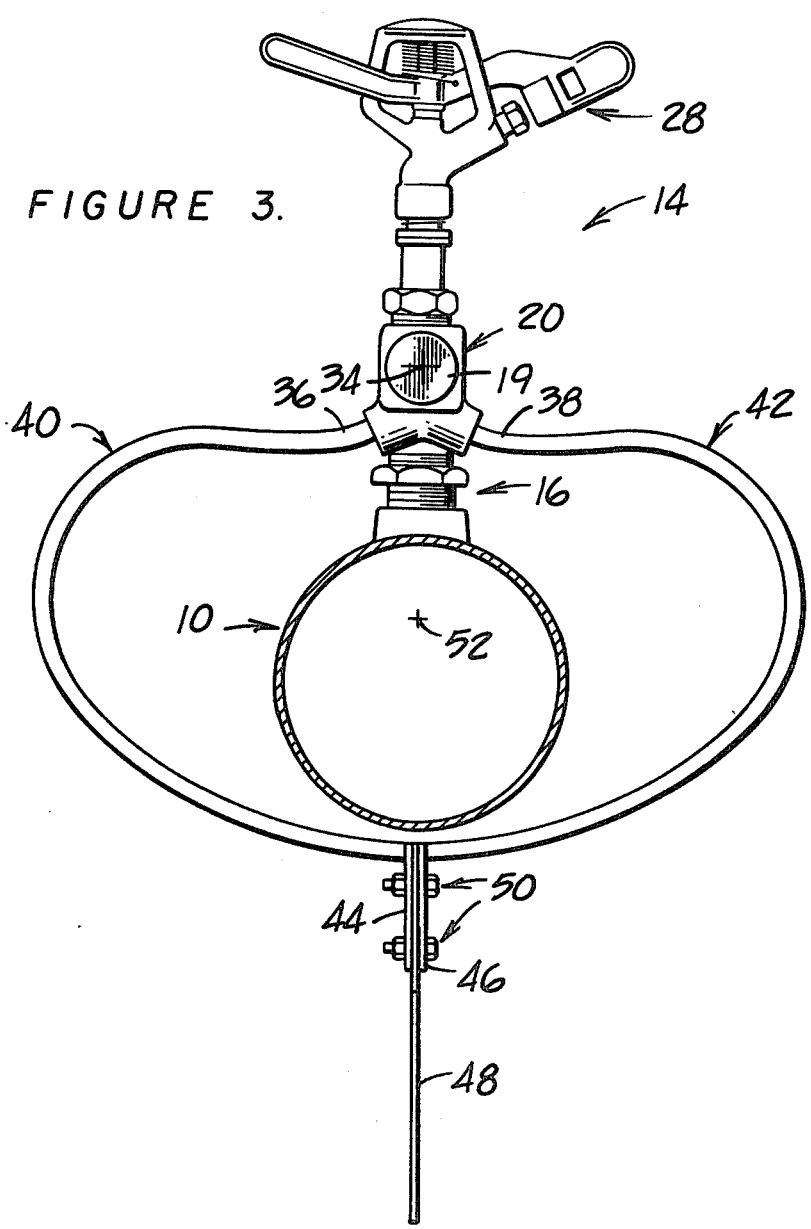
FIG. 3 is an end view of the apparatus shown in FIG. 2.

As shown in FIGS. 1–4, and particularly in FIGS. 2–4, a branch pipe 16 is secured to the main pipe 10 and communicates therewith. Screwingly secured to branch pipe 16 is an elongate plug 17 (FIG. 4). A water conducting means in the form of a collar 20 is pivotally mounted about elongate plug 17 and retained on plug 17 between shoulder 18 of branch pipe 16 and annular end flange 19 of plug 17. The inner passageway 23 of pipe 16 communicates with an axial bore 24 defined by plug 17. Further radial bores 25 provide fluid communication between axial bore 24 and a chamber 26 in collar 20. Washers 21 and 22, which are mounted in internal annular grooves defined by collar 20, provide a fluid seal between the radial bores 25 of elongate plug 17 and chamber 26 of collar 20. The collar 20 has fixed thereto a sprinkler head 28, the sprinkler head 28 communicating with the chamber 26. The collar 20 is pivotable about a single horizontal pivot axis 34, which is substantially parallel to the longitudinal axis of the main pipe 10.

Fixed to the opposite sides of the collar 20 are the respective ends 36, 38 of generally U-shaped bars 40, 42. The bars 40, 42 include at the opposite ends thereof respective plates 44, 46 to which a bladelike member 48 is secured by means of nuts and bolts 50. The bars 40, 42 thus make up connector means interconnecting the collar 20 and bladelike member 48. The bladelike member 48 has substantially flat, opposite sides, and is quite thin as shown. The combined collar 20, bar 40, bar 42 and bladelike member 48 generally surround the main pipe 10. In fact, with the sprinkler head 28 in an erect position, the sprinkler head 28 and bladelike member 48 are positioned so that the main pipe 10 lies generally therebetween. The pivot axis 34 lies in the plane of the bladelike member 48.

It should be noted that the center of gravity 52 of the entire pivotal structure, i.e., the center of gravity of the combined sprinkler head 28, water conducting means 20, bladelike member 48, and connector means 40, 42, is positioned so that the sprinkler head 28 is urged toward an erect position. It should further be noted that the center of gravity 52 of such structure lies substantially directly below the pivotal connection of the collar 20 and branch pipe 16 with the sprinkler head 28 in an erect position. Thus, the weight of the pivotal structure is closely aligned with the actual area of support, and is not greatly cantilevered therefrom.

INDUSTRIAL APPLICABILITY

In the use of the device, it will be seen that, in accordance with the previously described operation, the entire apparatus of FIG. 1 may be moved from one area to another. Upon arrival at the new area and with only a general positioning of the line 10, the structure described provides that each sprinkler head 28 is in an erect position. It should also be noted that the branch pipe 16 does not extend to a position relatively remote from the main line 10. Rather, each sprinkler head 28 is quite close to the main line 10.

In the event that a wind should act on the irrigation system while it is in operation, such wind will act on the substantially bladelike member 48 to pivot the entire pivotal structure 20,28,40,42,48 to lean the head 28 into the wind. This tilting of the head 28 into the wind provides more water flow into the wind, thus compensating for a loss of irrigation in that area which would come about if the sprinkler head 28 did not so tilt.

It will thus be seen that a highly efficient and compact apparatus for achieving the above objects is set forth.

What is claimed is:

1. An irrigation apparatus comprising: a main pipe, a branch pipe secured to the main pipe, a water conducting means secured to the branch pipe, a sprinkler head secured to the water conducting means, a bladelike member having substantially flat opposite sides, and connector means interconnecting the water conducting means and bladelike member, the center of gravity of the combined sprinkler head, water conducting means, bladelike member, and connector means being positioned so that the sprinkler head is urged toward an erect position, the position of the sprinkler head, water conducting means, connector means and bladelike member being responsive to wind acting on the bladelike member, and including means for pivotally connecting the water conducting means to the branch pipe, and wherein the center of gravity of the combined sprinkler head, water conducting means, bladelike member, and connector means lies substantially directly below the pivotal connection of the water conducting means and branch pipe with the sprinkler head in an erect position and wherein the sprinkler head and bladelike member are positioned so that the main pipe lies generally therebetween with the sprinkler head in an erect position, and wherein the connector means comprises a first bar, spaced from the main pipe with the sprinkler head in an erect position, which interconnects the water conducting means and bladelike member, and a second bar, spaced from the main pipe with the sprinkler head in an erect position, which interconnects the water conducting means and bladelike member, the combined water conducting means, first bar, second bar and bladelike member generally surrounding the main pipe and pivotable on said branch pipe relative to said main pipe.

2. The apparatus of claim 1 wherein the pivot axis of the water conducting means is substantially parallel to the longitudinal axis of the main pipe.

3. An irrigation apparatus adapted for attachment to a branch pipe communicating with a main pipe, comprising water conducting means pivotally connectable to a branch pipe, a sprinkler head secured to the water conducting means, a bladelike member having substantially flat opposite sides, and connector means interconnecting the water conducting means and bladelike manner, the position of the sprinkler head, water conducting means, connector means, and bladelike member being responsive to wind acting on the bladelike member, and wherein the sprinkler head and bladelike member are positioned so that the main pipe lies generally therebetween with the sprinkler head in an erect position, and wherein the connector means comprises a first bar, spaced from the main pipe with the sprinkler head in an erect position, which interconnects the water conducting means and bladelike member, and a second bar, spaced from the main pipe, with the sprinkler head in an erect position, which interconnects the water conducting means and bladelike member, the combined water conducting means, first bar, second bar and bladelike member are positioned to generally surround a main pipe.

4. An irrigation apparatus comprising:
   a main pipe, a branch pipe secured to the main pipe, water conducting means pivotally connected to the branch pipe, a sprinkler head secured to the water conducting means, a body member, and connector means for interconnecting the water conducting means and body member, wherein the sprinkler head and body member are positioned so that the main pipe lies generally therebetween with the sprinkler head in an erect position, and wherein said connector means is spaced from said main pipe so that said body member, said connector means, and said water conducting means can pivot on said branch pipe relative to said main pipe.

5. An irrigation apparatus adapted for attachment to a branch pipe communicating with a main pipe, comprising water conducting means pivotally connectable to the branch pipe, a sprinkler head secured to the water conducting means, a bladelike member having substantially flat opposite sides, and connector means interconnecting the water conducting means and bladelike member and wherein said bladelike member is thin so that the bladelike member is responsive to even a low wind force acting on one of said sides to position the sprinkler head into the wind, and wherein the center of gravity of the combined sprinkler head, the water conducting means, the bladelike member and the connector means is positioned so that the sprinkler head is urged toward an erect position.

6. The apparatus of claim 5 wherein the sprinkler head and bladelike member are positioned so that the main pipe lies generally therebetween with the sprinkler head in an erect position.

7. An irrigation apparatus comprising:
a main pipe, a branch pipe secured to the main pipe, a water conducting means pivotally secured to the branch pipe, a sprinkler head secured to the water conducting means, a bladelike member having substantially flat opposite sides, and connector means interconnecting the water conducting means and bladelike member, and wherein said bladelike member is thin so that the bladelike member is responsive to even a low wind force acting on one of said sides to position the sprinkler head into the wind, and wherein the center of gravity of the combined sprinkler head, water conducting means, bladelike member, and connector means is positioned so that the sprinkler head is urged towad an erect position.

8. The apparatus of claim 7 wherein the sprinkler head and bladelike member are positioned so that the main pipe lies generally therebetween with the sprinkler head in an erect position.

* * * * *

UNITED STATES PATENT AND TRADEMARK OFFICE
CERTIFICATE OF CORRECTION

PATENT NO. : 4,204,643
DATED : May 27, 1980
INVENTOR(S) : Gail Cornelius

It is certified that error appears in the above—identified patent and that said Letters Patent is hereby corrected as shown below:

Column 4, line 29, "manner" should be --member--.

Signed and Sealed this

Ninth Day of September 1980

[SEAL]

Attest:

SIDNEY A. DIAMOND

Attesting Officer　　　Commissioner of Patents and Trademarks